United States Patent
Sugitani et al.

(10) Patent No.: US 9,567,483 B2
(45) Date of Patent: Feb. 14, 2017

(54) RESIN COMPOSITION, METHOD OF MANUFACTURING DISPLAY APPARATUS BY USING THE SAME, AND DISPLAY APPARATUS MANUFACTURED BY USING THE METHOD

(71) Applicant: SAMSUNG DISPLAY CO., LTD., Yongin, Gyeonggi-Do (KR)

(72) Inventors: Koichi Sugitani, Yongin (KR); Hoon Kang, Yongin (KR); Jae-Sung Kim, Yongin (KR); Jin-Ho Ju, Yongin (KR); Jin-Young Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 11 days.

(21) Appl. No.: 14/513,075

(22) Filed: Oct. 13, 2014

(65) Prior Publication Data
US 2015/0353767 A1 Dec. 10, 2015

(30) Foreign Application Priority Data

Jun. 10, 2014 (KR) .................. 10-2014-0070264

(51) Int. Cl.
*C09D 167/00* (2006.01)
*G02B 5/20* (2006.01)
*G02F 1/1341* (2006.01)

(52) U.S. Cl.
CPC ............. *C09D 167/00* (2013.01); *G02B 5/201* (2013.01); *G02F 1/1341* (2013.01)

(58) Field of Classification Search
CPC ...... C09D 167/00; G02F 1/1341; G02B 5/201
See application file for complete search history.

(56) References Cited

U.S. PATENT DOCUMENTS

| | | | |
|---|---|---|---|
| 5,986,729 A | 11/1999 | Yamanaka et al. | |
| 6,141,072 A | 10/2000 | Drabik et al. | |
| 6,656,660 B1 | 12/2003 | Urano et al. | |
| 6,982,140 B2 | 1/2006 | Hada et al. | |
| 7,005,244 B2 | 2/2006 | Park et al. | |
| 7,037,841 B2* | 5/2006 | Wu .................. | H01L 21/31144 257/E21.257 |
| 7,049,220 B2 | 5/2006 | Kurosawa et al. | |
| 7,504,699 B1 | 3/2009 | Kohl et al. | |
| 8,110,335 B2 | 2/2012 | Takeda et al. | |
| 2002/0012869 A1 | 1/2002 | Adams et al. | |
| 2007/0117045 A1 | 5/2007 | Maruyama et al. | |

(Continued)

FOREIGN PATENT DOCUMENTS

| | | |
|---|---|---|
| JP | 2004-354610 A | 12/2004 |
| JP | 2005-10213 A | 1/2005 |

(Continued)

OTHER PUBLICATIONS

English Patent Abstract for JP 2006-084798 A, which corresponds to JP Publ. No. 4707987 B2, published Mar. 30, 2006, 1 page.

(Continued)

*Primary Examiner* — Michelle Mandala
(74) *Attorney, Agent, or Firm* — Lewis Roca Rothgerber Christie LLP

(57) ABSTRACT

A method of manufacturing a display apparatus and a display apparatus manufactured by using (utilizing) the method.

20 Claims, 6 Drawing Sheets

(56) References Cited

U.S. PATENT DOCUMENTS

| | | |
|---|---|---|
| 2008/0227031 A1 | 9/2008 | Cameron |
| 2008/0233752 A1* | 9/2008 | Ko .................... B81C 1/00801 438/700 |
| 2012/0082941 A1 | 4/2012 | Ishigaki et al. |
| 2012/0229966 A1* | 9/2012 | Kim .................. G02B 26/0841 361/679.01 |

FOREIGN PATENT DOCUMENTS

| | | |
|---|---|---|
| JP | 4707987 B2 | 3/2006 |
| JP | 2009-20185 A | 1/2009 |
| WO | WO 2004/104702 A1 | 12/2004 |

OTHER PUBLICATIONS

Cooper, Wendy J., Effects of molecular weight and plasticization on dissolution rates of thin polymer films, Polymer, Jul. 1985, pp. 1069-1072, vol. 26, Butterworth & Co. Ltd.

Henderson, Clifford L., Introduction to DNQ-Novolac Resists, Functional Organic Materials & Organic Nanotechnology Lab, 6 pages.

Miller-Chou, Beth A., A review of polymer dissolution, Progress in Polymer Science 28, (2003), pp. 1223-1270, Elsevier Ltd.

Resin for electronic materials, website, 6 pages, Asahi Organic Chemicals Industry Co., Ltd., www.asahi-yukizai.co.jp.

* cited by examiner

RESIN COMPOSITION, METHOD OF MANUFACTURING DISPLAY APPARATUS BY USING THE SAME, AND DISPLAY APPARATUS MANUFACTURED BY USING THE METHOD

CROSS-REFERENCE TO RELATED APPLICATION

This application claims priority to and the benefit of Korean Patent Application No. 10-2014-0070264, filed on Jun. 10, 2014, in the Korean Intellectual Property Office, the disclosure of which is incorporated herein in its entirety by reference.

BACKGROUND

1. Field

One or more embodiments of the present invention relate to a resin composition, a method of manufacturing display apparatus by using (utilizing) the same, and a display apparatus manufactured by using (utilizing) the method.

2. Description of the Related Art

Liquid crystal display apparatus is one of the most widely used (utilized) flat panel display apparatuses. In general, a liquid crystal display apparatus uses (utilizes) an electric field to control light transmittance through liquid crystal having dielectric anisotropy to display images.

In general, liquid crystal display apparatuses are manufactured by disposing two substrates such that surfaces of the substrates on which electrodes are formed may face each other and by filling space between the electrodes with a liquid crystal material.

Various processes have been tried to simplify the process of manufacturing liquid crystal display apparatuses. For example, after disposing a thin film transistor array substrate on a color filter array substrate, a liquid crystal layer may be formed. Here, an inlet that allows for the injection of liquid crystal may be formed. A liquid crystal layer may be formed by immersing the inlet in a liquid crystal tank.

SUMMARY

Aspects of one or more embodiments of the present invention are directed toward a resin composition, a method of manufacturing a display apparatus by using (utilizing) the same, and a display apparatus manufactured by using (utilizing) the method to simplify a process of manufacturing a display apparatus and improve reliability of the display apparatus.

Additional aspects will be set forth in part in the description which follows and, in part, will be apparent from the description, or may be learned by practice of the presented embodiments.

According to one or more embodiments of the present invention, the method of manufacturing the display apparatus includes: forming a sacrificial layer on a substrate; forming a conductive layer on the sacrificial layer; forming a photo pattern that exposes a part of the conductive layer by using (utilizing) a photoresist on the conductive layer; etching the exposed part of the conductive layer by using (utilizing) the photo pattern as a mask; removing the photo pattern; and forming a cavity by removing the sacrificial layer.

The removing of the photo pattern and the forming of the cavity by removing the sacrificial layer may be performed concurrently or simultaneously.

The method may further include allowing an entire surface of the substrate to be exposed in (to) light after the etching of the exposed part of the conductive layer by using (utilizing) the photo pattern as a mask.

The sacrificial layer and the photo pattern may be formed of the same material.

The sacrificial layer may be formed by coating a composition including: a polymer resin containing an acid-dissociative crosslink; a photoacid generator; and a solvent.

The acid-dissociative crosslink may be an acetal bond-containing crosslink or an ester bond-containing crosslink.

The polymer resin may include a structure unit represented by one of Formulae 1 to 7 below:

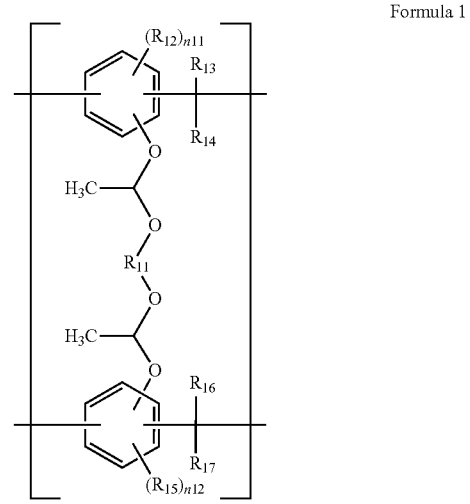

Formula 1

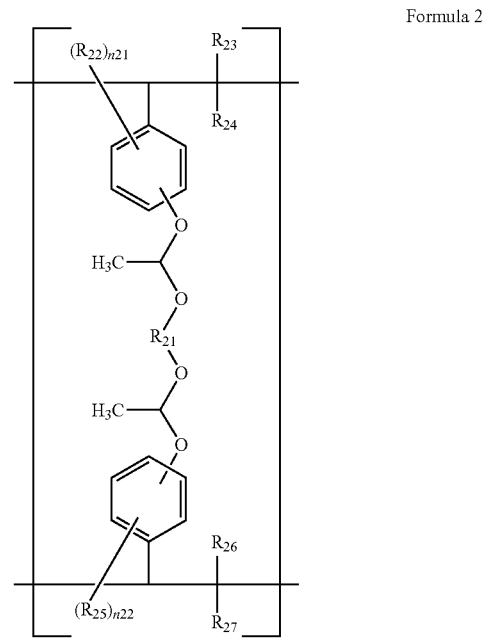

Formula 2

Formula 3

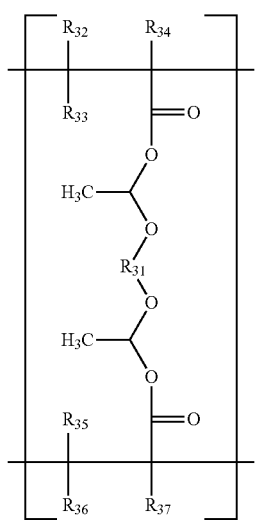

Formula 4

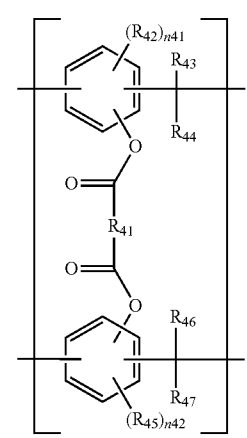

Formula 5

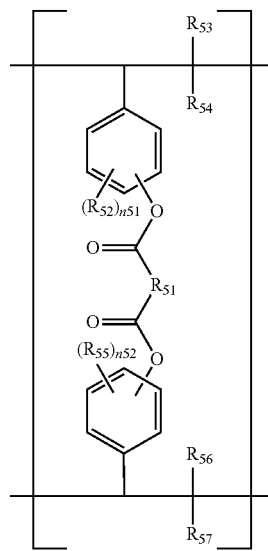

Formula 6

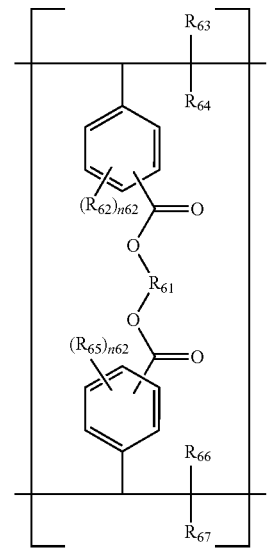

Formula 7

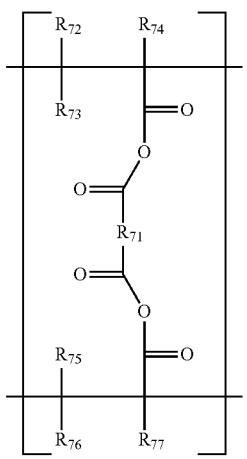

wherein, in Formulae 1 to 7, $R_{11}$, $R_{21}$, $R_{31}$, $R_{41}$, $R_{51}$, $R_{61}$, and $R_{71}$ may be each independently selected from a substituted or unsubstituted $C_1$-$C_{10}$ alkylene group and a substituted or unsubstituted $C_3$-$C_{10}$ cycloalkylene group;

$R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ may be each independently selected from a hydrogen atom, a deuterium atom, a halogen atom, a cyano group, a nitro group, and a $C_1$-$C_{10}$ alkyl group;

n11, n12, n41, and n42 may be each independently an integer of 1 to 3; and n21, n22, n51, n52, n61, and n62 may be each independently an integer of 1 to 4.

$R_{11}$, $R_{21}$, $R_{31}$, $R_{41}$, $R_{51}$, $R_{61}$, and $R_{71}$ may be each independently selected from a methylene group, an ethylene group, a propylene group, and a cyclohexylene group.

The forming of the conductive layer on the sacrificial layer may be performed by vapor-depositing a conductive layer material on the sacrificial layer.

The substrate may be a color filter array substrate that includes a common electrode in a surface of the substrate on which the sacrificial layer is formed.

The method may further include filling the cavity with a liquid crystal after the forming of the cavity by removing the sacrificial layer.

The method may further include baking the sacrificial layer before the forming of the conductive layer on the sacrificial layer.

According to one or more embodiments of the present invention, a display apparatus manufactured by utilizing a method that includes: forming a sacrificial layer on a substrate; forming a conductive layer on the sacrificial layer; forming a photo pattern that exposes a part of the conductive layer by using (utilizing) a photoresist on the conductive layer; etching the exposed part of the conductive layer by using (utilizing) the photo pattern as a mask; removing the photo pattern; and forming a cavity by removing the sacrificial layer.

The display apparatus may be manufactured by using (utilizing) the method further including allowing an entire surface of the substrate to be exposed to light after the etching of the exposed part of the conductive layer by using (utilizing) the photo pattern as a mask.

The sacrificial layer may be formed by coating the substrate with a composition containing: a polymer resin comprising an acid-dissociative crosslink; a photoacid generator; and a solvent.

The substrate may be a color filter array substrate that includes a common electrode in a surface of the substrate on which the sacrificial layer is formed.

According to one or more embodiments of the present invention, a resin composition includes: a polymer resin including an acid-dissociative crosslink; a photoacid generator; and a solvent.

The acid-dissociative crosslink may be an acetal bond-containing crosslink or an ester bond-containing crosslink.

The polymer resin may include a structure unit represented by one of Formulae 1 to 7 below:

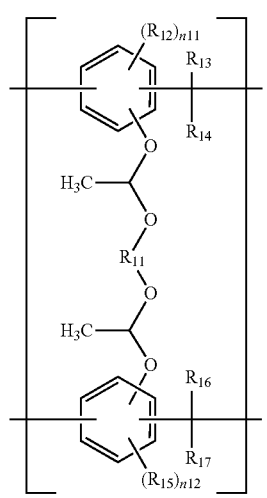

Formula 1

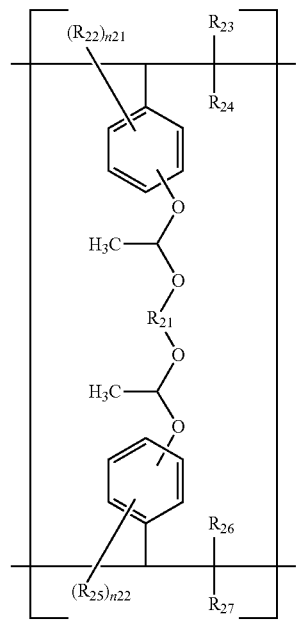

Formula 2

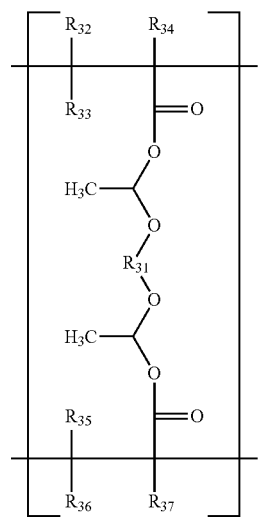

Formula 3

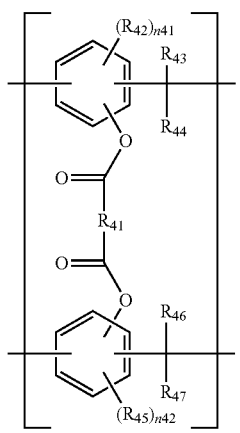

Formula 4

Formula 5

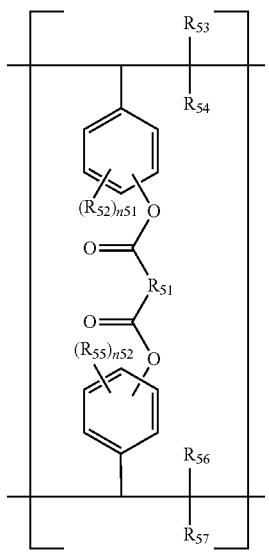

Formula 6

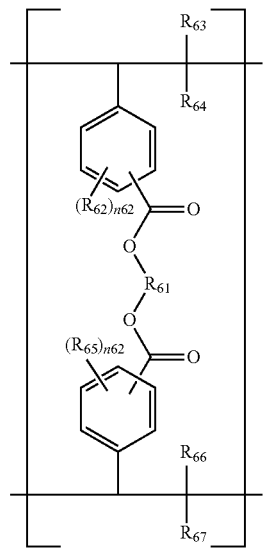

Formula 7

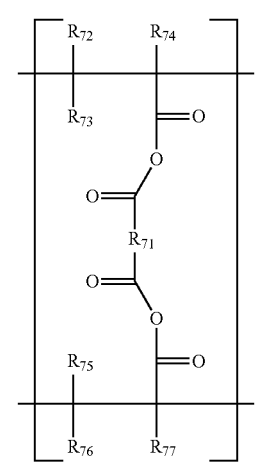

wherein, in Formulae 1 to 7, $R_{11}$, $R_{21}$, $R_{31}$, $R_{41}$, $R_{51}$, $R_{61}$, and $R_{71}$ may be each independently selected from a substituted or unsubstituted $C_1$-$C_{10}$ alkylene group and a substituted or unsubstituted $C_3$-$C_{10}$ cycloalkylene group;

$R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ may be each independently selected from a hydrogen atom, a deuterium atom, a halogen atom, a cyano group, a nitro group, and a $C_1$-$C_{10}$ alkyl group;

n11, n12, n41, and n42 may be each independently an integer of 1 to 3; and n21, n22, n51, n52, n61, and n62 may be each independently an integer of 1 to 4.

In Formulae 1 to 7, $R_{11}$, $R_{21}$, $R_{31}$, $R_{41}$, $R_{51}$, $R_{61}$, and $R_{71}$ may be each independently selected from a methylene group, an ethylene group, a propylene group, and a cyclohexylene group.

The resin composition may include: the polymer resin, including the acid-dissociative crosslink, at an amount of about 100 parts by weight; the photoacid generator at an amount of about 0.5 part to about 30 parts by weight; and the solvent for a remaining part.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
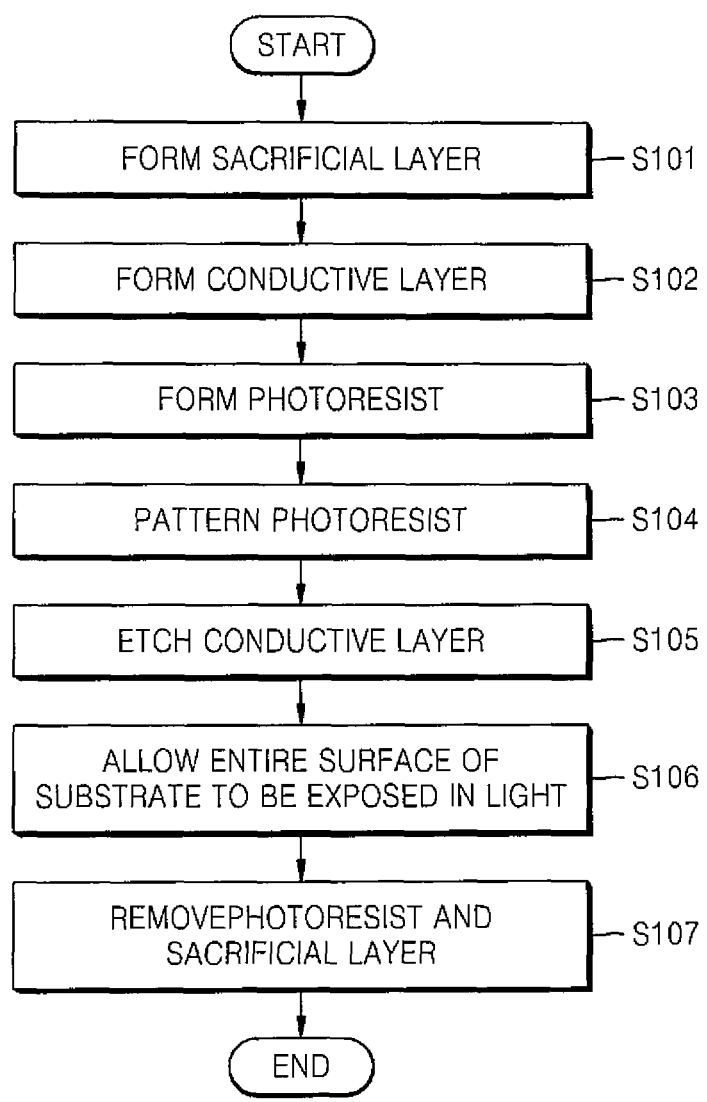
FIG. 1 is a flowchart illustrating a method of manufacturing a display apparatus according to an embodiment of the present invention.
Figure 2A:
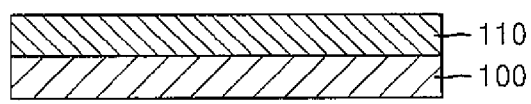
FIGS. 2A through 2G are cross-sectional views illustrating the method of manufacturing a display apparatus according to an embodiment of the present invention.
Figure 2B:
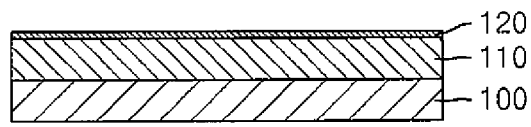
Figure 2C:
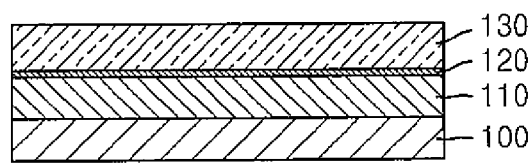
Figure 2D:
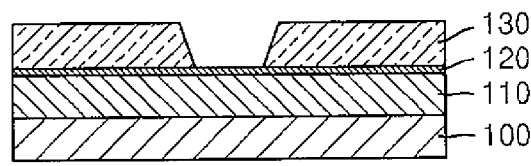
Figure 2E:
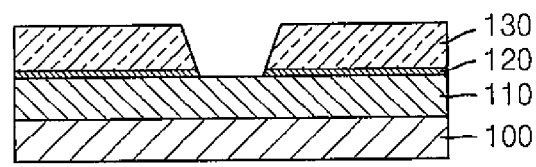
Figure 2F:
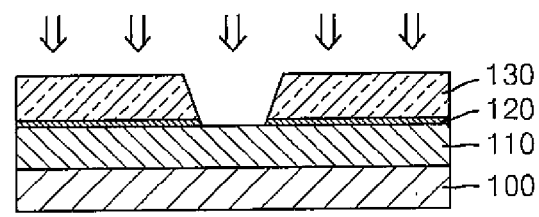
Figure 2G:
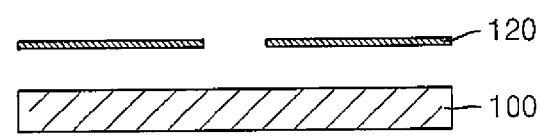

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the invention allows for various changes and numerous embodiments, particular embodiments will be illustrated in the drawings and described in more detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

While such terms as "first," "second," etc., may be used to describe various components, such components must not be limited to the above terms. The above terms are used only to distinguish one component from another.

It will be understood that when a component, such as a layer, a film, a region, or a plate, is referred to as being "on" or "onto" another component, the component can be directly on the other component or intervening components may be present thereon.

Expressions such as "at least one of," when preceding a list of elements, modify the entire list of elements and do not modify the individual elements of the list. Further, the use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, the present invention will be described in more detail by explaining example embodiments of the invention with reference to the attached drawings. Like reference numerals in the drawings denote like elements.

In the drawings, the thicknesses of layers and, regions are exaggerated for clarity. Also, in the drawings, the thicknesses of some layers and regions are exaggerated for convenience of explanation.

Hereinafter, a method of manufacturing a display apparatus according to an embodiment of the present invention with reference to FIGS. 1 and 2 will be described in more detail. FIG. 1 is a flowchart illustrating a method of manufacturing a display apparatus according to an embodiment of the present invention. FIGS. 2A through 2G are cross-sectional views illustrating the method of manufacturing a display apparatus according to an embodiment of the present invention.

Referring to FIG. 1, the method of manufacturing a display apparatus includes forming a sacrificial layer (S101), forming a conductive layer (S102), forming a photoresist (S103), patterning the photoresist (S104), etching the conductive layer (S105), allowing an entire surface of a substrate to be exposed in (to) light (S106), and removing the photoresist and the sacrificial layer (S107). One or more processes described above may be omitted or performed in a different order.

First, a substrate 100 is prepared. The substrate 100 may be one of two substrates included in the display apparatus. The substrate 100 may compensate a phase difference of light that transmits through the display apparatus. Examples of the substrate 100 may include a C-plate, a zero-plate, and WV. The substrate 100 may be a color filter array.

When the substrate 100 is a color filter array substrate, a common electrode may be included in a surface of the substrate 100 on which a sacrificial layer 110 is formed. The color filter array substrate includes a common electrode, a color filter layer, a black matrix layer, a planarization layer, and a substrate. The common electrode may be formed of ITO, IZO, ZnO, or $In_2O_3$. The color filter layer is formed of red, green, and blue pixels on the substrate. The black matrix layer is disposed between red, green, and blue pixels and defines boundaries of areas of the red, green, and blue pixels, and thus color reproduction capability of the color pixels may improve. The planarization layer is disposed on top of the color filter layer and black matrix layer to decrease a gap formed at regions where the black matrix layer overlaps with the red, green, and blue color pixels. The substrate 100 is a transparent insulating substrate and is formed of a flexible material.

Next, the sacrificial layer 110 is formed. The sacrificial layer 110 may be formed on the substrate 100 by using (utilizing) an appropriate method such as immersing, spraying or spin-coating. The sacrificial layer 110 may be formed by coating the substrate 100 with a composition including a polymer resin containing an acid-dissociative crosslink; a photoacid generator; and a solvent.

A weight-average molecular weight of the polymer resin containing an acid-dissociative crosslink may be about 20,000 to about 30,000 so as not to be pyrolysed even at a temperature of about 100° C. to about 130° C. Also, when add is around, the acid-dissociative crosslink may be disconnected, and thus a weight-average molecular weight of the polymer resin containing an acid-dissociative crosslink may be decreased to about 2,000 to about 15,000.

When a sacrificial layer is formed of a composition including the polymer resin containing an acid-dissociative crosslink and a photoacid generator, a shape of the sacrificial layer is not easily modified, even when the sacrificial layer is heated to form a conductive layer thereon. Also, when removing the sacrificial layer, the sacrificial layer may be easily removed since a molecular weight of the polymer resin forming the sacrificial layer may be decreased by removing the crosslink with an acid.

The acid-dissociative crosslink is disconnected under an acidic condition, but a stable chemical bond under basic or neutral condition is not limited thereto. For example, the acid-dissociative crosslink may be an acetal bond-containing crosslink or an ester bond-containing crosslink, but is not limited thereto.

The polymer resin containing an acid-dissociative crosslink may include a structure unit represented by one of Formulae 1 to 7 below, but is not limited thereto:

Formula 1
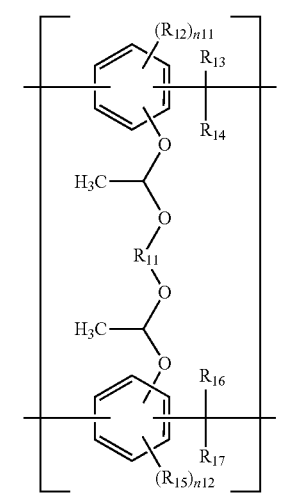
Formula 2
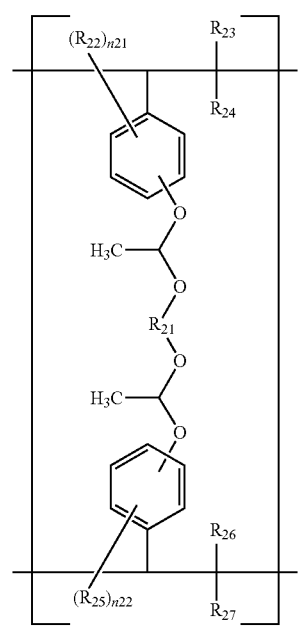
Formula 3
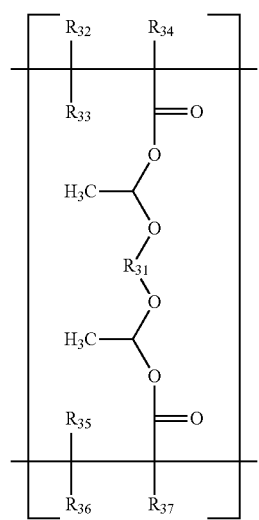
Formula 4
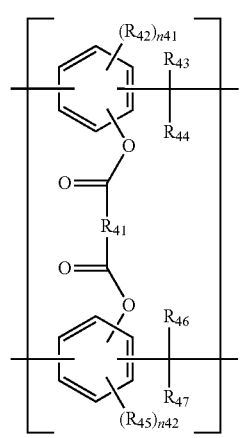
Formula 5
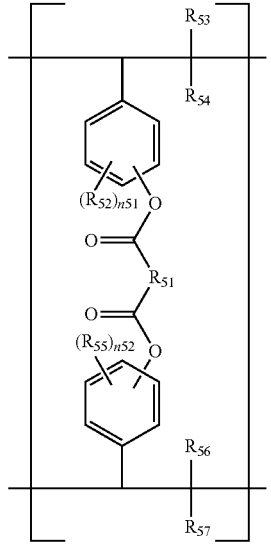
Formula 6
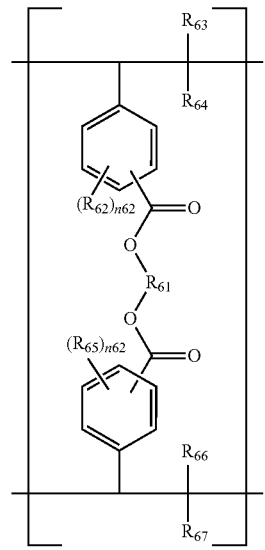

Formula 7

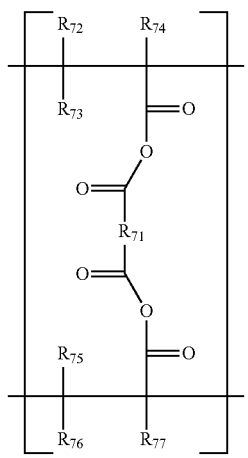

In Formulae 1 to 7, $R_{11}$, $R_{21}$, $R_{31}$, $R_{41}$, $R_{51}$, $R_{61}$, and $R_{71}$ are each independently selected from a substituted or unsubstituted $C_1$-$C_{10}$ alkylene group and a substituted or unsubstituted $C_3$-$C_{10}$ cycloalkylene group;

$R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ are each independently selected from a hydrogen atom, a deuterium atom, a halogen atom, a cyano group, a nitro group, and a $C_1$-$C_{10}$ alkyl group;

n11, n12, n41, and n42 are each independently an integer of 1 to 3; and n21, n22, n51, n52, n61, and n62 are each independently an integer of 1 to 4.

For example, in Formulae 1 to 7, $R_{11}$, $R_{21}$, $R_{31}$, $R_{41}$, $R_{51}$, $R_{61}$, and $R_{71}$ may be each independently selected from a methylene group, an ethylene group, a propylene group, and a cyclohexylene group, but are not limited thereto.

For example, in Formulae 1 to 7, $R_{11}$, $R_{21}$, $R_{31}$, $R_{41}$, $R_{51}$, $R_{61}$, and $R_{71}$ may be each independently selected from an ethylene group and a cyclohexylene group, but are not limited thereto.

For example, in Formulae 1 to 7, $R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ may be each independently selected from a hydrogen atom, a deuterium atom, a halogen atom, a cyano group, a nitro group, a methyl group, an ethyl group, an n-propyl group, and an iso-propyl group, but are not limited thereto.

For example, in Formulae 1 to 7, $R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ may be each independently selected from a hydrogen atom, a methyl group, and an ethyl group, but are not limited thereto.

For example, in Formulae 1 to 7, $R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ may each be a hydrogen atom, but are not limited thereto.

The photoacid generator is not limited as long as it may generate an acid when exposed to light, such as UV. For example, the photoacid generator may be a diazomethane-based photoacid generator, an oniumate-based photoacid generator, an oximesulfonate-based photoacid generator, a nitrobenzylsulfonate-based photoacid generator, and an iminosulfonate-based photoacid generator.

The solvent may be any solvent that is used (utilized) in the art to form the composition. Examples of the solvent may include an ester-based solvent such as a propylene glycol mono-alkyl ether acetate or a lactic acid ester, a ketone-based solvent such as an acetone methyl ethyl ketone or a cyclohexanone, a polyhydric alcohol-based solvent such as an ethylene glycol, a propylene glycol, or a diethylene glycol, and a derivative thereof.

The composition may further include an additive to enhance preservation stability. The additive may be a basic compound, for example an amine.

The composition may further include an additional photosensitizes.

The composition may include the polymer resin containing about 100 parts by weight of the acid-dissociative crosslink, about 0.5 part to about 30 parts by weight of the photoacid generator, about 0.01 part to about 5.1 parts by weight of the additive, and the solvent for a remaining part.

The solvent may be included in the composition, so that an amount of solid portion (the polymer resin containing the acid-dissociative crosslink, the photoacid generator, and the additive) in the composition is about 2 wt % to about 20 wt %.

The sacrificial layer 110 may be formed to have a thickness of about 2.5 μm to about 3.5 μm.

After coating the composition on the substrate 100, the method may include baking the sacrificial layer 110 at a temperature of about 20° C. to about 100° C. The baking of the sacrificial layer 110 is performed to reduce an amount of the solvent remaining in the sacrificial layer 110 while not pyrolyzing the polymer resin and the photoacid generator. In this regard, an amount of the solvent in the sacrificial layer 110 may be reduced, and thus an amount of the solvent out-gassing in a later process may be reduced. Therefore, quality of the display apparatus manufactured by using (utilizing) the method may be improved.

Next, a conductive layer 120 may be formed on the sacrificial layer 110. A conductive layer material for forming the conductive layer is not limited as long as the material is used to form an electrode of a display apparatus. For example, the conductive layer 120 may be formed of ITO, IZO, ZnO, or $In_2O_3$. The conductive layer 120 may be formed by vapor-depositing the conductive layer material at a temperature of about 100° C. to about 130° C. Since the conductive layer 120 is vapor-deposited in a high temperature atmosphere, the sacrificial layer 110 needs to be formed of a material that is stable at high temperature. The sacrificial layer 110 may be formed of a polymer resin having a weight-average molecular weight of about 20,000 to about 30,000.

Next, a photoresist layer is formed on the conductive layer 120 by using (utilizing) an appropriate method such as immersing, spraying or spin-coating the conductive layer 120 with a photoresist. Next, a photo pattern 130 that exposes a, part of the conductive layer 120 is formed through appropriate light exposure and development processes. The sacrificial layer 110 and the photo pattern 130 may be formed of the same material.

Then, an exposed part of the conductive layer 120 is etched by using (utilizing) the photo pattern 130 as a mask. The conductive layer 120 may be etched through an appropriate or suitable wet process.

Next, an entire surface of the substrate 100 is exposed to light. In other words, the substrate 100 is exposed to light by using (utilizing) an open mask. Due to the light exposure of the entire surface of the substrate 100, the photoacid generator generates an acid, and thus a crosslink of the polymer resin included in the sacrificial layer 110 may be disconnected. Due to the disconnection of the crosslink of the polymer resin, a molecular weight of the polymer resin may decrease, and thus the sacrificial layer 110 may be easily removed compared to a sacrificial layer including a polymer resin with a high molecular weight.

Next, the photo pattern 130 is removed. The photo pattern 130 may be removed by using (utilizing) an appropriate stripper. Then, a cavity may be formed between the substrate 100 and the conductive layer 120 by removing the sacrificial layer 110. That is, the cavity may be formed where the sacrificial layer 110 was removed. The sacrificial layer 110 may be also removed by using (utilizing) an appropriate or suitable stripper. Removing the photo pattern 130 and the sacrificial layer 110 may be reversed. Also, the photo pattern 130 and the sacrificial layer 110 may be removed concurrently or simultaneously. In particular, when the photo pattern 130 and the sacrificial layer 110 are formed of the same material, the photo pattern 130 and the sacrificial layer 110 may be removed concurrently or simultaneously under the same condition.

Next, the cavity is filled with a liquid crystal.

Figure 3:
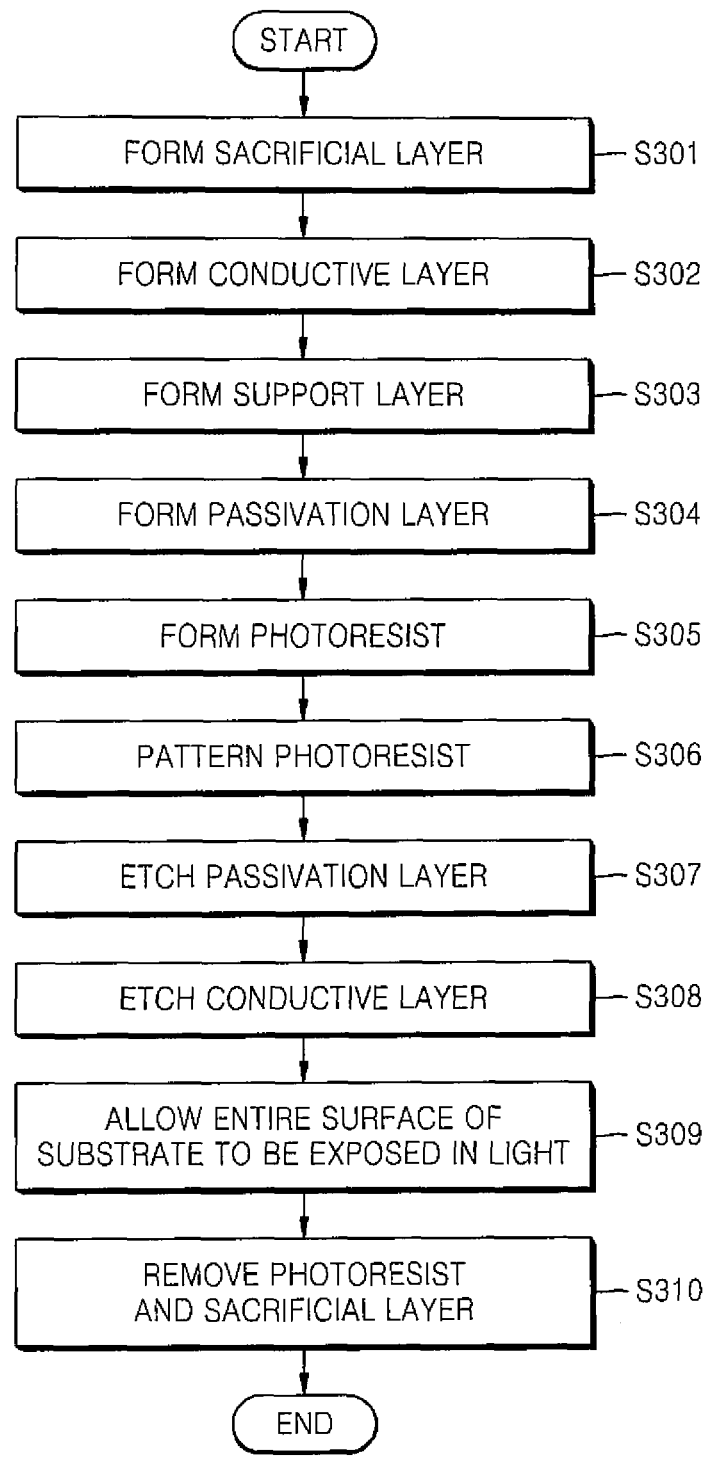
FIG. 3 is a flowchart illustrating a method of manufacturing a display apparatus according to another embodiment of the present invention.
Figure 4A:
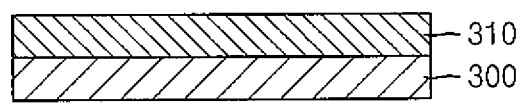
FIGS. 4A through 4I are cross-sectional views illustrating the method of manufacturing a display apparatus according to another embodiment of the present invention.
Figure 4B:
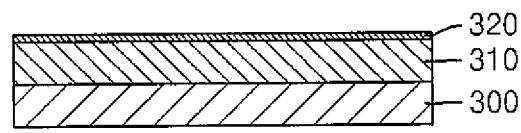
Figure 4C:
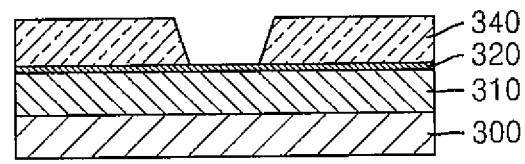
Figure 4D:
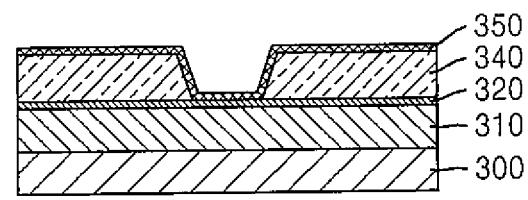
Figure 4E:
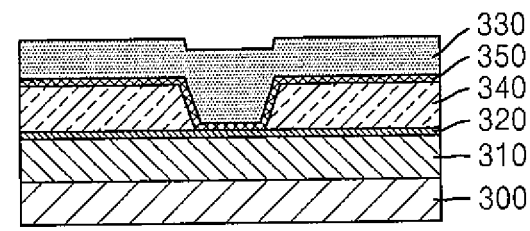
Figure 4F:
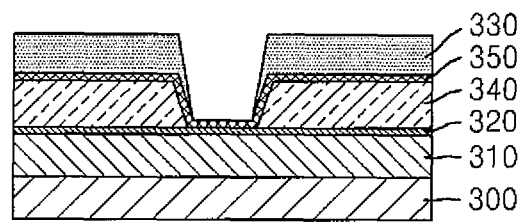
Figure 4G:
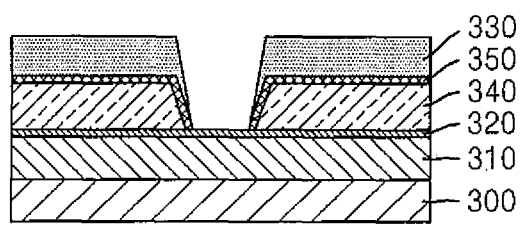
Figure 4H:
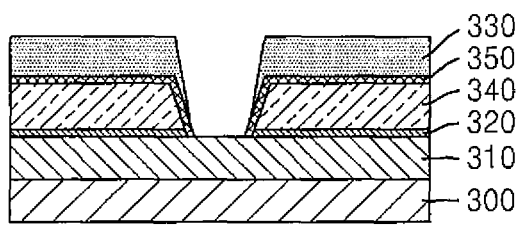
Figure 4I:
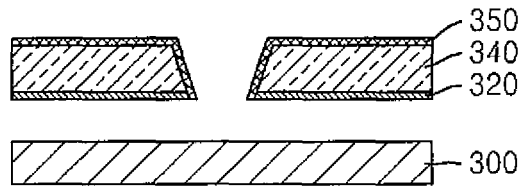

Hereinafter, a method of manufacturing a display apparatus according to another embodiment of the present invention will be described in more detail with reference to FIGS. 3 through 4I. FIG. 3 is a flowchart illustrating the method of manufacturing a display apparatus according to another embodiment of the present invention, and FIGS. 4A through 4I are cross-sectional views illustrating the method of manufacturing a display apparatus according to another embodiment of the present invention.

Referring to FIG. 3, the method of manufacturing a display apparatus includes forming a sacrificial layer (S301), forming a conductive layer (S302), forming a support layer (S303), forming a passivation layer (S304), forming a photoresist (S305), patterning the photoresist (S306), etching the passivation layer (S307), etching the conductive layer (S308), allowing an entire surface of a substrate to be exposed in (to) light (S309), and removing the photoresist and the sacrificial layer (S310). One or more processes described above may be omitted or performed in a different order.

First, a substrate 300 is prepared. The substrate 300 is as defined in the description of the substrate 100 in the above embodiment. Then, a sacrificial layer 310 is formed on the substrate 300. The sacrificial layer 310 is as defined in the description of the sacrificial layer 110 in the above embodiment. Then, a conductive layer 320 may be formed on the sacrificial layer 310. The conductive layer 320 is as defined in the description of the conductive layer 120 in the above embodiment.

Then, a support layer 340 is formed on the conductive layer 320. A material for forming the support layer 340 may be an insulating and/or inorganic material, but is not limited thereto.

Then, a passivation layer 350 is formed on the support layer 340. A material for forming the passivation layer 350 may be an insulating material and/or inorganic material. For example, the passivation layer 350 may be formed of an inorganic material such as $SiO_2$, $SiN_x$, $SiON$, $Al_2O_3$, $TiO_2$, $Ta_2O_5$, $HfO_2$, $ZrO_2$, BST, or PZT.

Next, a photoresist layer is formed on the passivation layer 350 by using (utilizing) an appropriate method such as immersing, spraying or spin-coating the display apparatus with a photoresist. Next, through appropriate light exposure and development processes, a photo pattern 330 that exposes a part of the passivation layer 350 is formed The photo pattern 330 is as defined in the description of the photo pattern 130 in the above embodiment.

Next, the exposed part of the passivation layer 350 is etched by using (utilizing) the photo pattern 130 as a mask.

The passivation layer 350 may be etched through an appropriate dry process. For example, the passivation layer 350 may be etched by using (utilizing) an $O_2$ plasma.

Thereafter, etching the conductive layer 320, allowing an entire surface of the substrate 300 to be exposed to light, removing the photo pattern 330, removing the sacrificial layer 310, and filling a liquid crystal may be added in the manner similar to those described in the above embodiment.

Figure 5:
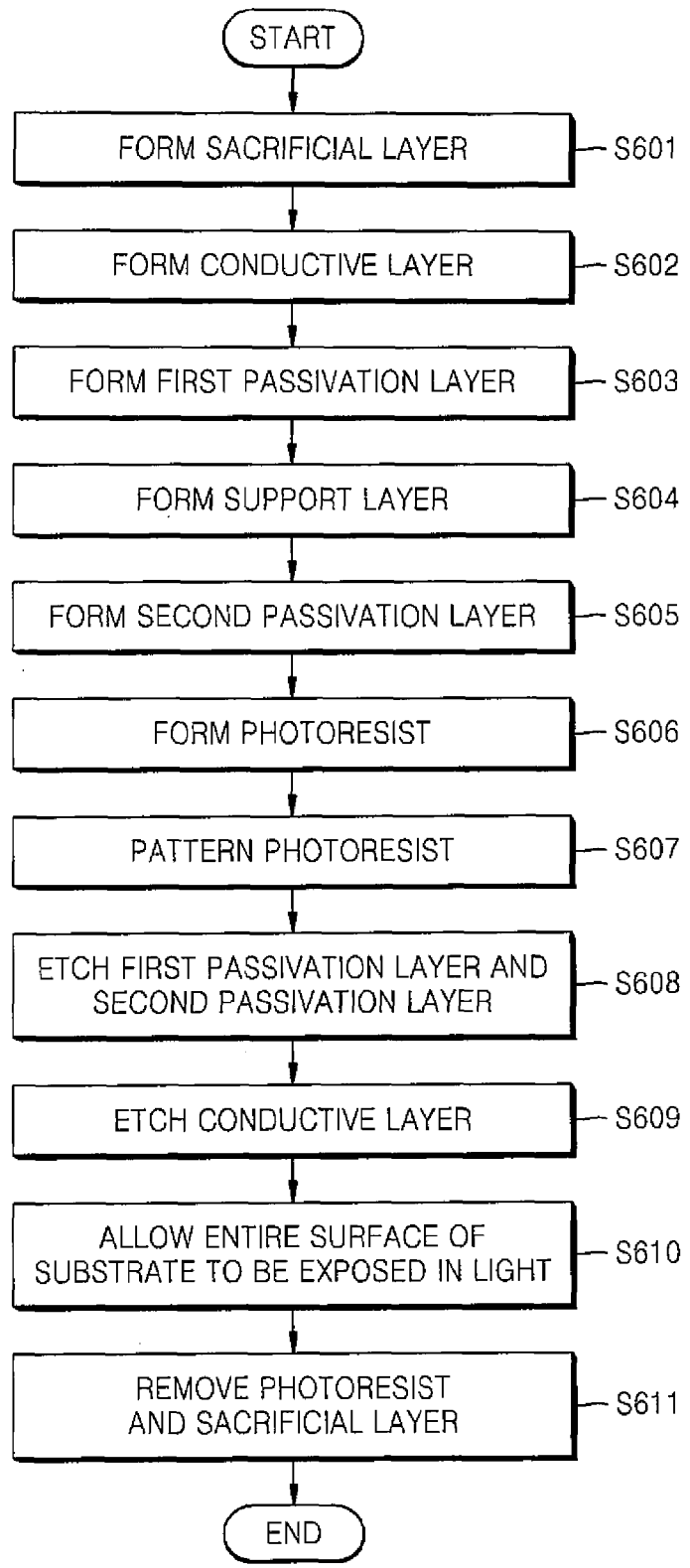
FIG. 5 is a flowchart illustrating a method of manufacturing a display apparatus according to another embodiment of the present invention.

Hereinafter, a method of manufacturing a display apparatus according to another embodiment of the present invention will be described in more detail with reference to FIG. 5. FIG. 5 is a flowchart illustrating the method of manufacturing a display apparatus according to another embodiment of the present invention.

Referring to FIG. 5, the method of manufacturing a display apparatus includes forming a sacrificial layer (S601), forming a conductive layer (S602), forming a first passivation layer (S603), forming a support layer (S604), forming a second passivation layer (S605), forming a photoresist (S606), patterning the photoresist (S607), etching the first and second passivation layers (S608), etching the conductive layer (S609), allowing an entire surface of the substrate to be exposed in (to) light (S610), and removing the photoresist and the sacrificial layer (S611). One or more processes described above may be omitted or performed in a different order.

First, a substrate is prepared. Next, a sacrificial layer is formed on the substrate. Next a conductive layer is formed on the sacrificial layer. Next, a first passivation layer is formed on the conductive layer. Next, a support layer is formed on the first passivation layer. The support layer is as defined in the description of the support layer in the above embodiment. Next, a second passivation layer is formed on the support layer. The second passivation layer is as defined in the description of the passivation layer in the above embodiment. Next, a photoresist layer is formed on the second passivation layer by using (utilizing) an appropriate method such as immersing, spraying, or spin-coating on the second passivation layer with photoresist. Next, a photo pattern that exposes a part of the second passivation layer is formed through appropriate light exposure and development processes. The photo pattern is as defined in the description of the photo pattern in the above embodiment. Next, the exposed part of the first passivation layer and the second passivation layer is etched by using (utilizing) the photo pattern as a mask. The first passivation layer and the second passivation layer may be etched through an appropriate dry process. For example, the first passivation layer and the second passivation layer may be etched by using (utilizing) an $O_2$ plasma. The substrate, the sacrificial layer, the conductive layer, the support layer, and the photoresist are as defined in the description of each in the above embodiment. The first passivation layer and the second passivation layer are as defined in the description of each in the above embodiment.

Thereafter, etching the conductive layer, allowing an entire surface of the substrate to be exposed to light, removing the photo pattern, removing the sacrificial layer, and filling a liquid crystal may be added in the manner similar to those described in the previous embodiment.

As described above, according to the one or more of the above embodiments of the present invention, a method of manufacturing a display apparatus and a display apparatus manufactured by using (utilizing) the method are provided to simplify a manufacturing process and improve reliability of the display apparatus. Also, a manufacturing cost of the display apparatus may be reduced by concurrently or simultaneously removing a sacrificial layer and a photo pattern.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A method of manufacturing a display apparatus, the method comprising:
    forming a sacrificial layer on a substrate by coating the substrate with a composition comprising:
        a polymer resin comprising an acid-dissociative crosslink;
        a photoacid generator; and
        a solvent;
    forming a conductive layer on the sacrificial layer;
    forming a photo pattern to expose a part of the conductive layer by utilizing a photoresist on the conductive layer;
    etching the exposed part of the conductive layer by utilizing the photo pattern as a mask;
    removing the photo pattern; and
    forming a cavity by removing the sacrificial layer.

2. The method of claim 1, wherein the removing of the photo pattern; and the forming of the cavity by removing the sacrificial layer are performed concurrently.

3. The method of claim 1 further comprising allowing an entire surface of the substrate to be exposed to light after the etching of the exposed part of the conductive layer by utilizing the photo pattern as a mask.

4. The method of claim 1, wherein the sacrificial layer and the photo pattern are formed of the same material.

5. The method of claim 1, wherein the acid-dissociative crosslink is an acetal bond-containing crosslink or an ester bond-containing crosslink.

6. The method of claim 1, wherein the polymer resin comprises a structure unit represented by one of Formulae 1 to 7 below:

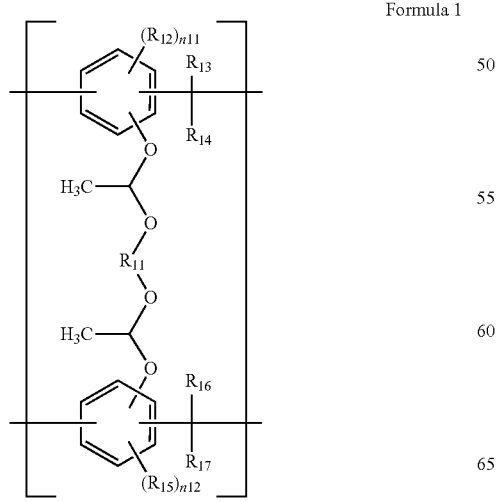

Formula 1

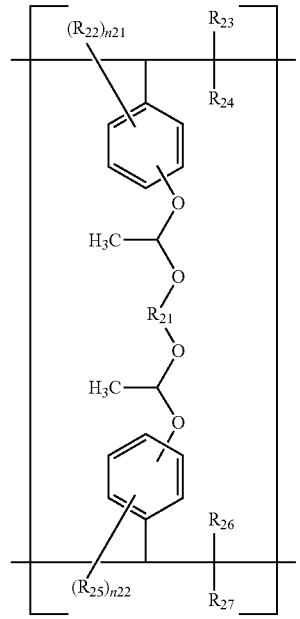

Formula 2

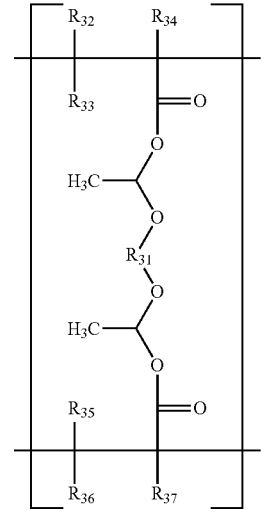

Formula 3

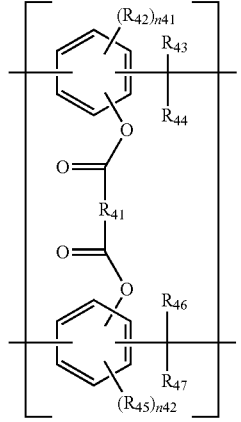

Formula 4

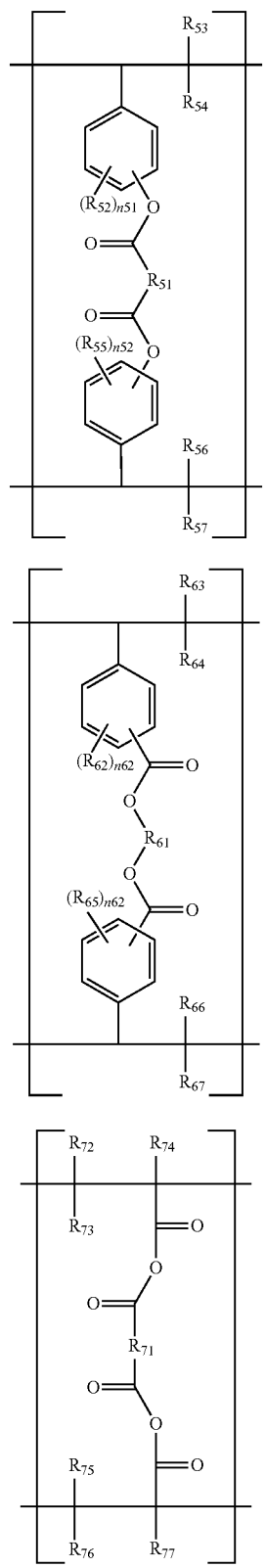

wherein, in Formulae 1 to 7, $R_{11}$, $R_{21}$, $R_{31}$, $R_{41}$, $R_{51}$, $R_{61}$, and $R_{71}$ are each independently selected from a substituted or unsubstituted $C_1$-$C_{10}$ alkylene group and a substituted or unsubstituted $C_3$-$C_{10}$ cycloalkylene group;

$R_{12}$ to $R_{17}$, $R_{22}$ to $R_{27}$, $R_{32}$ to $R_{37}$, $R_{42}$ to $R_{47}$, $R_{52}$ to $R_{57}$, $R_{62}$ to $R_{67}$, and $R_{72}$ to $R_{77}$ are each independently selected from a hydrogen atom, a deuterium atom, a halogen atom, a cyano group, a nitro group, and a $C_1$-$C_{10}$ alkyl group;

n11, n12, n41, and n42 are each independently an integer of 1 to 3; and n21, n22, n51, n52, n61, and n62 are each independently an integer of 1 to 4.

7. The method of claim 1, wherein the forming of the conductive layer on the sacrificial layer is performed by vapor-depositing a conductive layer material on the sacrificial layer.

8. The method of claim 1, wherein the substrate is a color filter array substrate that comprises a common electrode in a surface of the substrate on which the sacrificial layer is formed.

9. The method of claim 1 further comprising filling the cavity with a liquid crystal after the forming of the cavity by removing the sacrificial layer.

10. The method of claim 1 further comprising baking the sacrificial layer before the forming of the conductive layer on the sacrificial layer.

11. A display apparatus manufactured by utilizing a method comprising:
forming a sacrificial layer on a substrate;
forming a conductive layer on the sacrificial layer;
forming a photo pattern to expose a part of the conductive layer by utilizing a photoresist on the conductive layer;
etching the exposed part of the conductive layer by utilizing the photo pattern as a mask;
allowing an entire surface of the substrate to be exposed to light after the etching of the exposed part of the conductive layer by utilizing the photo pattern as a mask;
removing the photo pattern; and
forming a cavity by removing the sacrificial layer.

12. The display apparatus of claim 11, wherein the sacrificial layer is formed by coating the substrate with a composition comprising:
a polymer resin comprising an acid-dissociative crosslink;
a photoacid generator; and
a solvent.

13. The display apparatus of claim 11, wherein the substrate is a color filter array substrate comprising a common electrode in a surface of the substrate on which the sacrificial layer is formed.

14. A method of manufacturing a display apparatus, the method comprising:
forming a sacrificial layer on a substrate;
forming a conductive layer on the sacrificial layer;
forming a photo pattern to expose a part of the conductive layer by utilizing a photoresist on the conductive layer;
etching the exposed part of the conductive layer by utilizing the photo pattern as a mask;
removing the photo pattern;
forming a cavity by removing the sacrificial layer; and
filling the cavity with a liquid crystal after the forming of the cavity by removing the sacrificial layer.

15. The method of claim 14 further comprising allowing an entire surface of the substrate to be exposed to light after the etching of the exposed part of the conductive layer by utilizing the photo pattern as a mask.

16. The method of claim 14, wherein the sacrificial layer and the photo pattern are formed of the same material.

17. The method of claim 14, wherein the sacrificial layer is formed by coating the substrate with a composition comprising:
- a polymer resin comprising an acid-dissociative crosslink;
- a photoacid generator; and
- a solvent.

18. The method of claim 14, wherein the forming of the conductive layer on the sacrificial layer is performed by vapor-depositing a conductive layer material on the sacrificial layer.

19. The method of claim 14, wherein the substrate is a color filter array substrate that comprises a common electrode in a surface of the substrate on which the sacrificial layer is formed.

20. The method of claim 14 further comprising baking the sacrificial layer before the forming of the conductive layer on the sacrificial layer.

\* \* \* \* \*